United States Patent
Dupuis et al.

(10) Patent No.: US 11,921,342 B2
(45) Date of Patent: Mar. 5, 2024

(54) OUTDOOR PATHWAY SPLICE

(71) Applicant: CORNING RESEARCH & DEVELOPMENT CORPORATION, Corning, NY (US)

(72) Inventors: David Montalion Dupuis, Cedar Park, TX (US); Cary Alan Kipke, Austin, TX (US); Donald Kent Larson, Cedar Park, TX (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 792 days.

(21) Appl. No.: 17/019,426

(22) Filed: Sep. 14, 2020

(65) Prior Publication Data

US 2020/0409011 A1 Dec. 31, 2020

Related U.S. Application Data

(63) Continuation of application No. PCT/US2019/021596, filed on Mar. 11, 2019.

(60) Provisional application No. 62/643,314, filed on Mar. 15, 2018.

(51) Int. Cl.
| | |
|---|---|
| *G02B 6/50* | (2006.01) |
| *C09J 7/20* | (2018.01) |
| *C09J 7/38* | (2018.01) |
| *H02G 3/30* | (2006.01) |
| *H02G 9/02* | (2006.01) |

(52) U.S. Cl.
CPC .................... *G02B 6/50* (2013.01); *C09J 7/20* (2018.01); *C09J 7/38* (2018.01); *H02G 3/305* (2013.01); *C09J 2301/124* (2020.08); *H02G 9/025* (2013.01)

(58) Field of Classification Search
None
See application file for complete search history.

(56) References Cited

U.S. PATENT DOCUMENTS

| | | | |
|---|---|---|---|
| 4,117,192 A | 9/1978 | Jorgensen | |
| 4,129,673 A | 12/1978 | Eigenmann | |
| 4,388,359 A | 6/1983 | Ethen et al. | |
| 4,681,401 A | 7/1987 | Wyckoff | |

(Continued)

FOREIGN PATENT DOCUMENTS

WO 2018/017475 A1 1/2018

OTHER PUBLICATIONS

European Patent Application No. 19768533.2, Extended European Search Report, dated Nov. 17, 2021; 9 pages; European Patent Office.

(Continued)

*Primary Examiner* — Rhonda S Peace
(74) *Attorney, Agent, or Firm* — William D. Doyle

(57) ABSTRACT

An outdoor cable pathway splice comprises a splice tape comprising a first adhesive layer and a reinforcing layer disposed on one major surface of the adhesive layer. The first adhesive layer is capable of adhering to a concrete or asphalt surface. The splice tape is configured to join first and second distribution cabling tapes in an end-to-end manner when deployed. Each distribution cabling tape includes a continuous lengthwise channel configured to receive at least one distribution cable, wherein the at least one distribution cable is covered by the splice tape when deployed.

7 Claims, 3 Drawing Sheets

(56) References Cited

U.S. PATENT DOCUMENTS

| | | | |
|---|---|---|---|
| 4,685,824 A | 8/1987 | Eigenmann | |
| 4,988,541 A | 1/1991 | Hedblom | |
| 5,077,117 A | 12/1991 | Harper et al. | |
| 5,227,221 A | 7/1993 | Hedblom | |
| 5,453,320 A | 9/1995 | Harper et al. | |
| 5,593,246 A | 1/1997 | Hedblom et al. | |
| 5,683,746 A | 11/1997 | Hedblom et al. | |
| 5,763,000 A | 6/1998 | Hedblom | |
| 5,906,889 A | 5/1999 | Miron | |
| 5,928,761 A | 7/1999 | Hedblom et al. | |
| 6,231,962 B1 | 5/2001 | Bries et al. | |
| 6,431,788 B1 | 8/2002 | Hedblom et al. | |
| 6,479,132 B2 | 11/2002 | Hedblom et al. | |
| 9,985,424 B2 * | 5/2018 | Wolf | G02B 6/4459 |
| 10,606,018 B2 * | 3/2020 | Clatanoff | E01F 9/518 |
| 11,381,069 B2 * | 7/2022 | Borer | H02G 9/025 |
| 2001/0019764 A1 | 9/2001 | Bries et al. | |
| 2004/0050584 A1 | 3/2004 | Hager et al. | |
| 2009/0004423 A1 | 1/2009 | Dietz | |
| 2011/0030190 A1 * | 2/2011 | Larson | G02B 6/4466 29/428 |
| 2014/0137974 A1 | 5/2014 | Lunceford et al. | |
| 2014/0153893 A1 * | 6/2014 | Berglund | G02B 6/4459 385/136 |
| 2015/0124924 A1 * | 5/2015 | Moore | G08G 1/01 73/862.51 |
| 2015/0284599 A1 | 10/2015 | Kerep et al. | |
| 2018/0017750 A1 | 1/2018 | Clatanoff et al. | |
| 2020/0227904 A1 | 7/2020 | Borer et al. | |
| 2020/0409011 A1 * | 12/2020 | Dupuis | C09J 7/20 |
| 2021/0009861 A1 * | 1/2021 | Kipke | H02G 3/0437 |

OTHER PUBLICATIONS

International Search Report and Written Opinion of the International Searching Authority; PCT/US2019/021596; dated May 24, 2019, 6 pages; European Patent Office.

Kipke et al., U.S. Appl. No. 62/567,516, "Distribution Cabling Tape, System and Tape Application Device," filed Oct. 3, 2017.

\* cited by examiner

OUTDOOR PATHWAY SPLICE

PRIORITY APPLICATION

This application is a continuation of International Patent Application Number PCT/US2019/021596, filed Mar. 11, 2019, which claims priority to U.S. Provisional Application No. 62/643,314, filed on Mar. 15, 2018, the content of each of which is relied upon and incorporated herein by reference in its entirety.

FIELD

The present invention is directed to an outdoor cable pathway splice for splicing distribution cabling tape, also referred to as "road tape," to further protect distribution cable being distributed to an area or neighborhood with a plurality of users or potential users.

BACKGROUND

Communications service providers are faced with increasing demands to deliver faster and better service to their customers. Service providers can meet these needs for greater bandwidth by incorporating fiber optics in the access network, the communication connection to the end subscriber. Service providers have announced gigabit service offerings.

With many players competing in the industry, speed to build new networks is critical. However, the process to deploy traditional fiber optic networks often requires time consuming civil engineering work both in planning, verifying existing infrastructure location and construction. The access network can be the most burdensome in that individual fibers must connect each subscriber's living unit. In the case of single family home neighborhoods, that means a single fiber to each home.

For aerial deployments (telephone poles), deploying the fiber optic cable is relatively straight forward. Lashing the new fiber optic distribution cable to existing telephone cabling or stringing a new messenger wire in which to lash the new fiber optic cable is done relatively quickly (about a day to install the distribution cable for a serving area of 200-500 homes). However, for new entrants for fiber-to-the-home (FTTH) service, gaining access to the telephone poles from the pole owner (often incumbent telephone company) can be a time consuming and litigious process.

For below grade deployments (conduit below grade in which to pull the distribution cable) deployment can involve many construction machines and operators for weeks for a serving area of 200-500 homes. One of the most time consuming operations is directional drilling to place the conduit below grade. The cost of directional drilling is approximately $40/foot making below grade fiber access network deployment cost much more than aerial deployments.

Therefore, need exists for an alternative to traditional aerial and below grade installations that can eliminate the need to share telephone poles and avoid the time consuming and costly directional drilling for conduit placement.

SUMMARY

According to one embodiment of the present invention, an outdoor cable pathway splice comprises a splice tape comprising a first adhesive layer and a reinforcing layer disposed on one major surface of the adhesive layer, wherein the first adhesive layer is capable of adhering to a concrete or asphalt surface, wherein the splice tape is configured to join first and second distribution cabling tapes in an end-to-end manner when deployed, wherein each distribution cabling tape includes a continuous lengthwise channel configured to receive at least one distribution cable, wherein the at least one distribution cable is covered by the splice tape when deployed. In another aspect, the splice further comprises a second adhesive layer, wherein the reinforcing layer is disposed between the first and second adhesive layers.

The above summary of the present invention is not intended to describe each illustrated embodiment or every implementation of the present invention. The figures and the detailed description that follows more particularly exemplify these embodiments.

BRIEF DESCRIPTION OF THE DRAWINGS

The present invention will be further described with reference to the accompanying drawings, wherein.

Figure 1A:
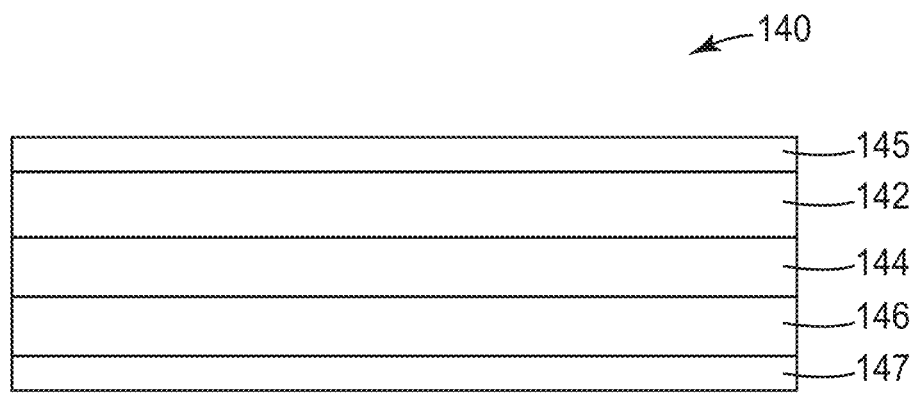
FIG. 1A is a side view of an exemplary splice for an outdoor cable pathway according to an embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "forward," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention.

The present invention is directed to a splice for an outdoor fiber pathway system that distributes communication cabling, which can include optical fiber or other communications or electrical media, to an area or neighborhood with a plurality of users or potential users. One component of the system is a durable, protective distribution cabling tape that includes or covers a channel for receiving a distribution cable, such as fiber optic network cable. The distribution cabling tape is configured to adhere to an asphalt or concrete surface, such as a road, curb, walkway, bridge support, building base or other foundation. In one aspect, the distribution cabling tape includes a channel that is configured to receive at least a portion of a distribution cable, which can include copper wire(s) and/or optical fiber(s). Typically, such distribution cable includes a durable protective jacket and one or more strength members. The splice tape is used to join two distribution cabling tapes in an end-to-end manner while protecting the distribution cable.

Figure 1B:
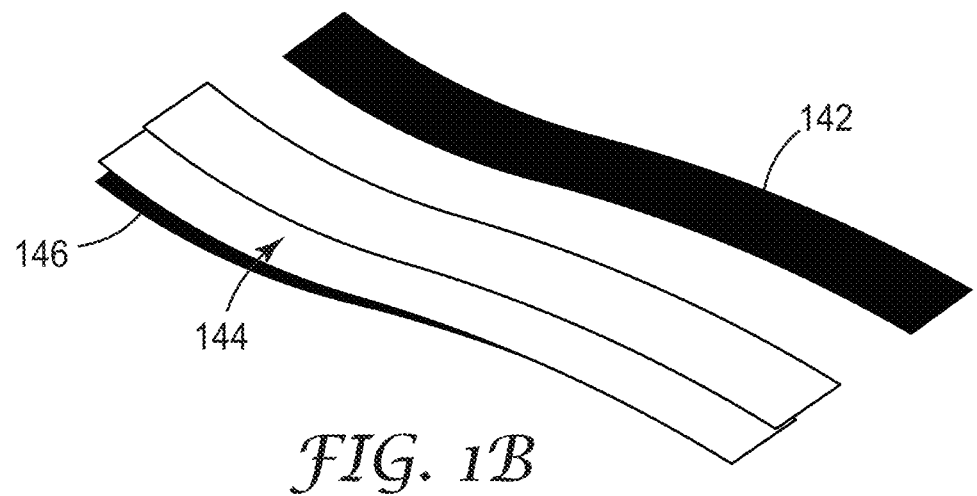
FIG. 1B is a partial exploded isometric view of the exemplary splice of FIG. 1A.
Figure 1C:
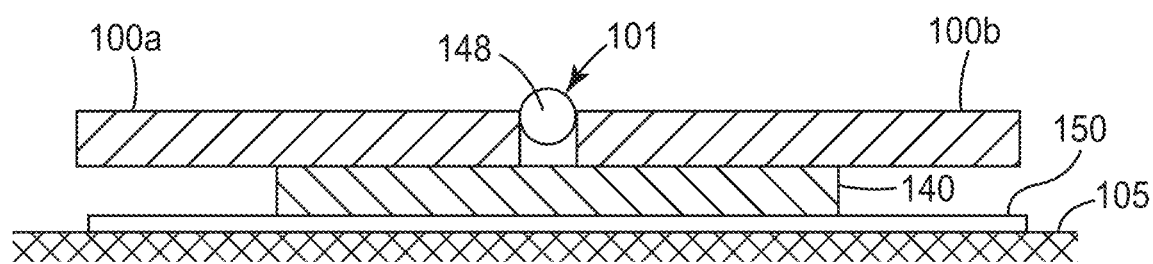
FIG. 1C is a schematic cross section view of the exemplary splice of FIG. 1A joining two segments of distribution cabling tape.
Figure 1D:
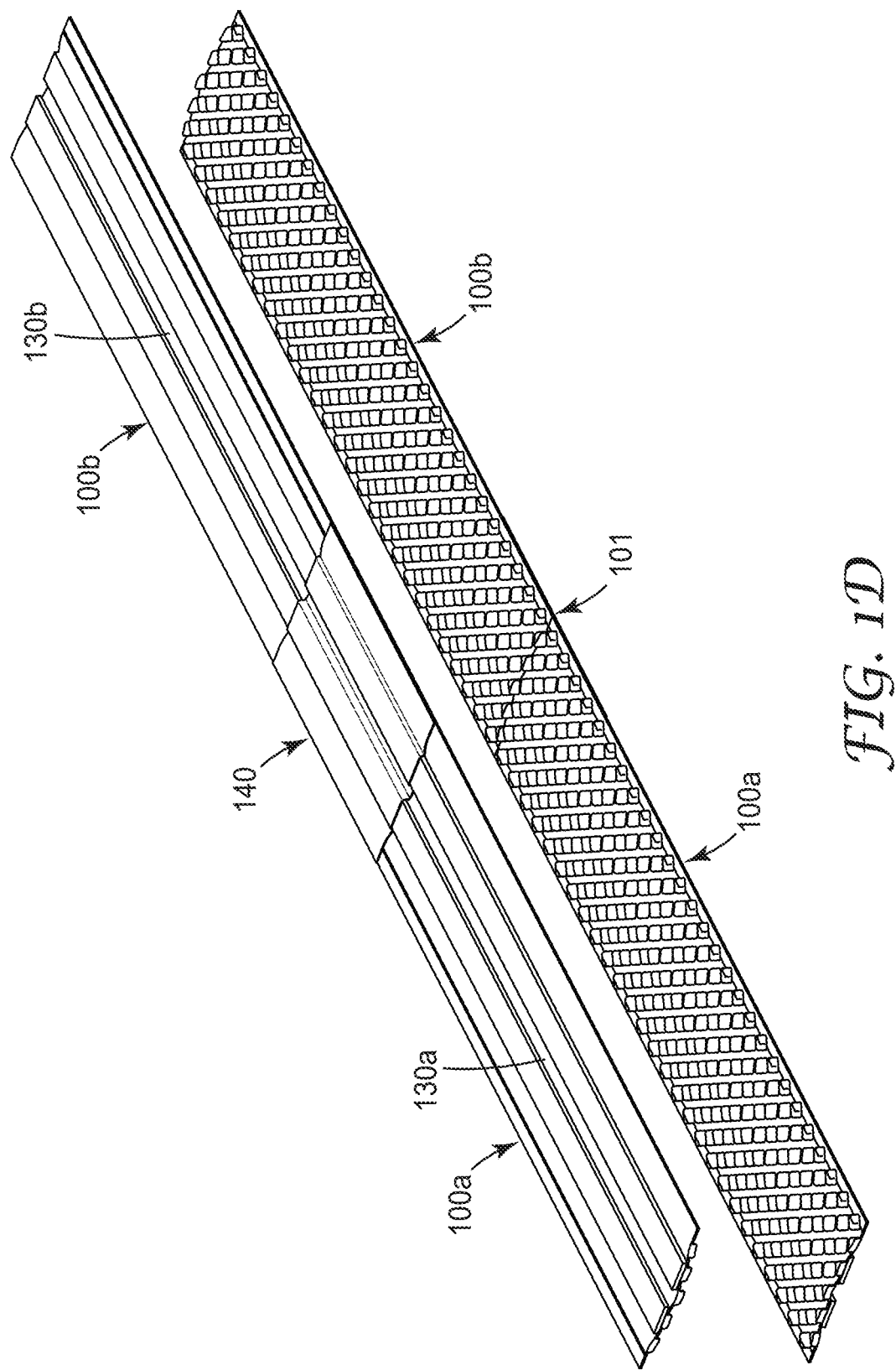
FIG. 1D shows isometric views of the deployed splice.

FIGS. 1A and 1B show different views of an exemplary splice tape 140 according to a first embodiment of the invention. FIG. 1C shows a schematic view of an exemplary splice deployment using the splice tape 140. FIG. 1D shows a bottom and a top view of a deployed splice.

A splice tape 140 is shown in side view in FIG. 1A. The splice tape 140 comprises a first adhesive layer 146 and a reinforcing layer 144 disposed on one major surface of the adhesive layer 146. The first adhesive layer 146 is formed from a material that is capable of adhering to a concrete or asphalt surface. Optionally, the splice tape 140 can further include a second adhesive layer 142. Adhesive layer 142 can be formed from the same or different adhesive as layer 146. In one example embodiment, the width of the splice tape 140 can be about 3" to about 5", preferably about 4", in order to completely overlap the distribution cabling tapes being joined/spliced on the adhesive side of the tapes. The thickness of the adhesive layers 146, 142, can be from about 3 to 16 mil., preferably about 6-12 mil. The adhesive layers can comprise the adhesive materials described in more detail below.

The reinforcing layer 144 provides durability and structural integrity to splice tape 140 to help prevent dislodgment or breakage under an applied pulling or sheering force. In one exemplary aspect, the reinforcing layer 144 can comprise one or more overlapping strips of fiberglass tape. In operation, in one embodiment of the invention, the reinforcing layer 144 can adhere to a first adhesive portion of the first distribution cabling tape and to a second adhesive portion of the second distribution cabling tape. In an alternative embodiment, if the splice tape 140 includes a second adhesive layer 142, in operation, the second adhesive layer 142 adheres to the first adhesive portion of the first distribution cabling tape and to the second adhesive portion of the second distribution cabling tape.

The splice tape 140 addresses a potential issue when joining distribution cabling tape in the field. When deploying multiple rolls of tape in the field, in one approach, the roll of a first distribution cabling tape can be completely laminated to the road surface, then a new roll can be mounted and threaded through a feeding device to restart the process. Using this approach, (1) the tape threading process may be time consuming, and (2) the ability to evenly butt the end of the new tape roll with the end of the depleted tape roll on the road may be challenging. In most cases, there is a gap left between the first and second tape ends. This gap would leave the fiber optic cable unprotected within the gap. In addition, when using the aforementioned distribution cabling tapes, oftentimes the upper surface of the distribution cabling tape includes a low adhesion backside (LAB) coating that prevents strong adhesion to an overlapping tape. As such, according to one aspect of the present invention, a splice tape 140 can be utilized to join the different rolls of distribution cabling tape, while still providing good overall structural integrity and protecting a distribution cable disposed beneath.

A partial exploded view is shown in FIG. 1B, where the reinforcing layer 144 is disposed on adhesive layer 146, and adhesive layer 142 can optionally be applied to the other major surface of reinforcing layer 144.

Further, optionally, the splice tape 140 can include a first removable liner 147 that can be placed on a surface of adhesive layer 146 to protect the adhesive layer and to protect against inadvertent bonding to an object prior to deployment. During deployment, the liner 147 can be removed just prior to application of the adhesive layer 147 to the road surface. In addition, optionally, the splice tape 140 can include a second removable liner 145 that can be placed on a surface of adhesive layer 142 to protect the adhesive layer prior to deployment. During deployment, if the splice tape includes a second adhesive layer 142, the liner 145 can be removed prior to application of the adhesive layer 142 to the adhesive side of the distribution cabling tape 100a, 100b.

As shown in FIGS. 1C and 1D, the splice tape 140 can be configured to splice or join first and second distribution cabling tapes 100a, 100b in an end-to-end manner when deployed. Each of the distribution cabling tapes 100a, 100b has an adhesive layer capable of adhering to road, curb, or other surface. A more detailed description of an exemplary distribution cabling tape 100 is described below and further details regarding the construction and/or deployment of exemplary distribution cabling tape can be found in PCT Pub. No. WO 2018/017475 and U.S. Prov. Patent App. No. 62/567,516, each incorporated by reference herein in their entirety.

As shown in FIG. 1C, a distribution cable 150 is disposed on the surface of roadway 105. To join first distribution cabling tape 100a to second distribution cabling tape 100b in an end-to-end manner, splice tape 140 overlaps the ends of distribution cabling tapes 100a, 100b. In this manner, the splice tape 140 covers and protects the distribution cable 150 as one distribution cabling tape ends and a second distribution cabling tape begins.

As shown in FIG. 1D, the upper illustration shows the bottom or adhesive side of a first distribution cabling tape 100a being joined to a second distribution cabling tape 100b via a splice tape 140. As shown, each distribution cabling tape includes a continuous lengthwise channel 130a, 130b configured to receive at least one distribution cable 150. The splice tape 140 can conform to the shape of the lower side of the distribution cabling tapes, including channels 130a, 130b. The adhesive side of the splice tape 140 is laminated to the butted ends of the tapes so that it overlaps each distinct tape segment 100a, 100b by approximately 2-4 inches. Pressure can then be applied to the surface of the remaining release liner 147 to improve lamination of the splice tape 140, then liner 147 can be remove prior to application of the spliced tape to the road.

The lower illustration of FIG. 1D shows the upper or top side of the joined distribution cabling tapes 100a, 100b. At the interface 101 of the splice, as further shown in FIG. 1C, a bead of caulking material 148 can be applied to the gap 101 to fill any remaining space between the ends of the distribution cabling tapes. Removal of the tackiness of the caulking material 148 (such as 3M Strip Calk, available from 3M Company, St. Paul, MN) can be accomplished by dusting the surface of the filling material with road dirt or fine sand. It is cosmetically more appealing if the color of the detackifing material matches the color of the distribution cabling tape surface. Alternatively, an abrasive powder such as aluminum oxide can be used.

Figure 2:
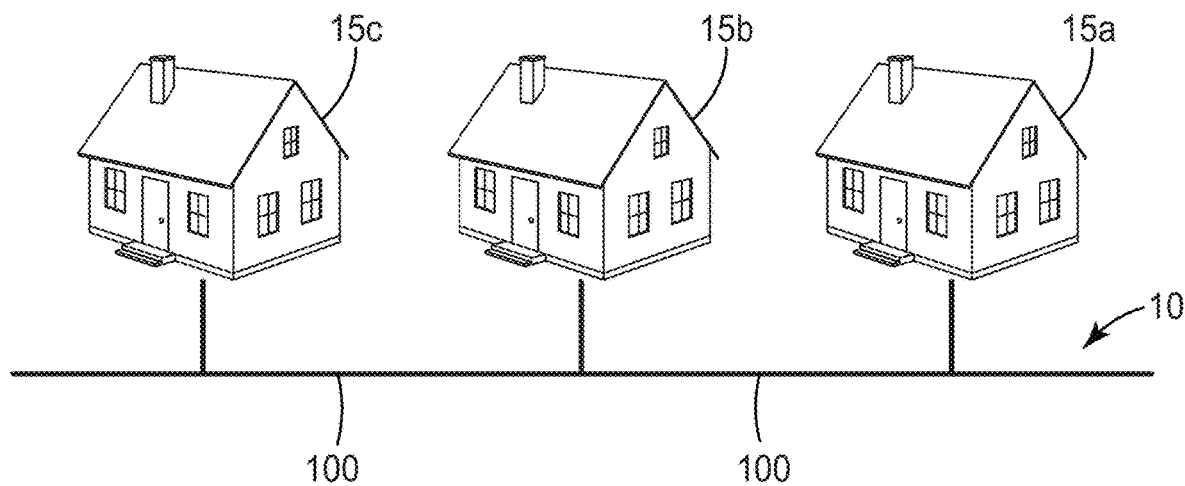
FIG. 2 is an exemplary neighborhood deployment of an outdoor fiber pathway according to an embodiment of the present invention.
Figure 3:
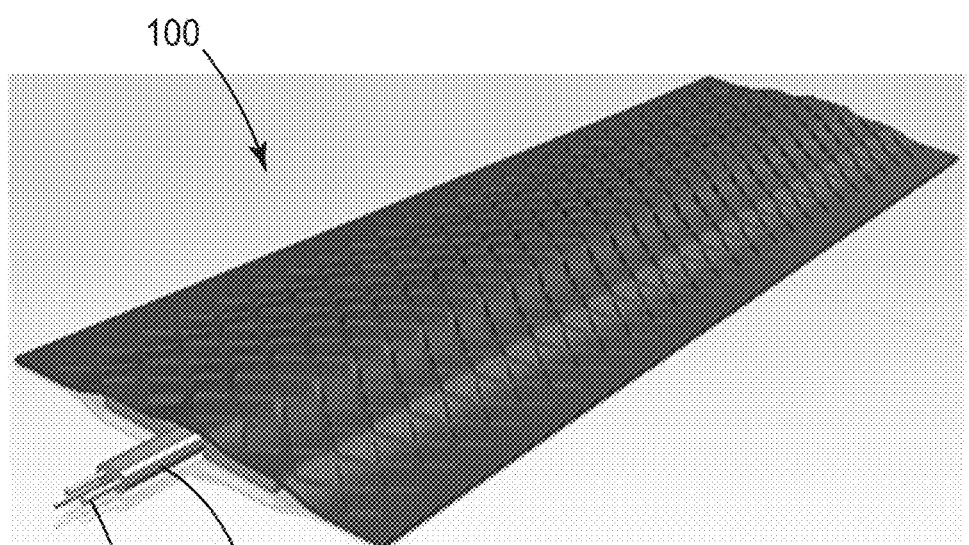
FIG. 3 is an isometric view of an exemplary distribution cabling tape that is part of an outdoor fiber pathway according to an embodiment of the present invention.

FIGS. 2 and 3 are illustrative of an exemplary outdoor fiber pathway system and distribution cabling tape according to an aspect of the invention. The outdoor pathway system 10 includes a distribution cable 150 comprising at least one strength member. For means of clarity, a flat cable (in cross section view) has a width greater than its height and is said to lay flat (or horizontal) when the width of the cable is in contact with the ground or road. A cable is said to be in a vertical position when the cable is rotated 90 degrees relative to the plane of the ground or road.

As shown in FIG. 2, the outdoor pathway system 10 includes distribution cabling tape 100 providing distribution cable to a neighborhood, such as homes 15a-15c. In one aspect, the distribution cabling tape 100 can comprise a resilient polymeric base sheet having a first major surface and a second major surface. The tape 100 also includes an adhesive layer capable of adhering to a concrete or asphalt surface disposed on at least a portion of the major surface. In some cases, the first major surface includes a continuous lengthwise channel formed in a first portion thereof. In other cases, the continuous lengthwise channel is formed on the surface of the adhesive layer. In addition, the continuous lengthwise channel is configured to receive at least one distribution cable 150.

FIG. 3 shows an exemplary distribution cabling tape system 100 that includes a distribution cable 150 disposed in a lengthwise channel. In this aspect, the distribution cable 150 includes one or more electrical lines or optical fibers 155. In some aspects, cable 150 can include one or more strength members such as is present in commercially available cable, such as OFS Toneable Mini LT Flat Drop Fiber Optic Cable (available from OFS Fitel, LLC, Norcross, GA), 3M™ Clear Fiber Drop Cable (available from 3M Company, St. Paul MN), or ROC™ Drop Dielectric Cable (available from Corning Inc., Hickory NC). Other suitable cables include CampusLink™ Indoor/Outdoor cable (available from Prysmian Group, Lexington, SC). Alternatively, in some aspects, the distribution cable 150 can comprise a conventional ribbon fiber having multiple fibers or a series of parallel optical fibers disposed on a filament tape to allow straightforward access to separate individual fibers by peeling away one or more fibers or peeling off a portion of the filament tape. As such, the distribution cable 150 can have a circular, oval, or rectangular cross section profile. In other alternative embodiments, the lengthwise channel can be configured to accommodate more than one distribution cable.

The distribution cabling tape 100 includes a resilient polymeric base sheet that can be formed from a single material, or, alternatively, different materials. For example, a first portion of the polymeric base sheet can be formed from a first material, such as a toughened or semi-rigid polymer material and other portions can be formed from a different material, such as a more flexible elastomeric (lower modulus) material. Such a composite base sheet can be formed by coextruding the two different polymers, as would be apparent to one of skill in the art given the present description.

At least a portion of the base sheet can be covered by an adhesive layer. The adhesive layer comprises a composition that is capable of adhering to a concrete or asphalt surface, such as a road, curb, or walkway surface. In one aspect, a pressure sensitive adhesive (PSA) is designed to adhere to a common road, curb, or walkway surface, such as concrete and asphalt surfaces, and to withstand the wide temperature variations, weather and chemicals present. For example, acceptable PSA formulations are described in U.S. Pat. Nos. 5,906,889 and 5,453,320, each of which is incorporated by reference herein in its entirety. In another aspect, the adhesive can comprise a heat activated adhesive. In addition, other types of adhesives can be used, depending on the duration of the intended deployment of the distribution cabling tape. Such adhesive materials can be used in the splice tape 140 as well.

A second or top layer of the base sheet may be a flat surface or it may have a raised pattern surface of raised structures (such as is shown in FIG. 3). The base sheet can be any color so that the tape can stand out (such as including white or yellow coloring) or it can blend into the surface upon which it is mounted (such as including gray or black coloring) or it can be covered with conventional road surfacing or resurfacing materials. Retroreflective elements, glass and/or ceramic beads, can be embedded directly on the second surface as is described in U.S. Pat. No. 4,388,359, which is incorporated by reference in its entirety. Alternatively, the second surface can be coated with either a thermoplastic or thermosetting layer. For flat markings, an example of a thermoplastic material is described in U.S. Pat. No. 4,117,192, which is incorporated by reference in its entirety, and for thermosetting an example material is described in U.S. Pat. No. 5,077,117, which is incorporated by reference in its entirety. For base sheets having a plurality of raised protuberances, example materials are described in U.S. Pat. Nos. 4,988,541, 5,683,746, 5,593,246, 6,479,132, 5,928,761, 5,227,221, and 5,763,000, each of which is incorporated by reference in its entirety. Additionally, other patterns and designs of raised protuberances are described in U.S. Pat. Nos. 4,388,359, 4,988,541, 5,683,746, and 4,681,401, each of which is incorporated by reference in its entirety. For applications where roads may be subject to snow and ice accumulation, exemplary base sheets designed to resist the action of snowplow blades are described in U.S. Pat. Nos. 4,129,673, 4,685,824, and 6,431,788, each of which is incorporated by reference in its entirety. Exemplary commercially available pavement marking tapes include those sold under the Stamark™ brand, including 380 IES and 380 AW models, available from 3M Company, St. Paul Minnesota.

Acceptable methods of forming a tape structure using the exemplary base sheets and adhesives described herein can include hot embossing, double sided embossing, patterned nip rolls, doctor blading (for adhesives), and pattern coating techniques. For example, patterned embossing rolls can be brought into contact with opposing sides of a web of the base sheet material to generate the desired patterns on each side of the base sheet (e.g., diamonds on the air side (e.g., top surface) and continuous channel on the road side). Doctor blades or pattern coating can be used to apply adhesives in non-channel areas.

It is noted that while structure 100 is referred to herein as a "tape," this term is not meant to exclude other types of adhesive-coated structures, such as adhesive-coated road patches, panels or markers that can provide a protective conduit or other type of pathway for cables. In addition, the distribution cabling tape can also provide a protective pathway for electrical or power lines that are to be distributed through a neighborhood, or across a road, curb, street, parking lot or sidewalk, or for cabling repairs and/or splices. Moreover, the adhesive can be selected to provide either a temporary or more permanent type of bond to the road, curb, or walkway, thus providing a distribution cabling solution for short term events (such as concerts, sporting events, festivals, and the like), or for more longer duration deployment situations (such as subdivisions in development). In one example, tape 100 can include a pressure sensitive adhesive (PSA) layer, having a thickness of from about 3 to 16 mil, preferably about 6-12 mil.

In addition, while the tape embodiments described herein are often used in road, curb, sidewalk, or street applications, in alternative embodiments, the distribution cabling tape can be used to distribute cabling along other surfaces, such as along or up the side of a building, tower, bridge, or other structures. As such, the splicing tape 140 can be utilized in these implementations as well. Further, while distribution cable 150 is described herein as a distribution cable, tape 100 can be used to route and/or protect many different types of cables, including communication cables, power cables (such as low voltage power cables), sensor wires, co-axial cables, signal cables, and other conventional cables, or other types of equipment, such as sensors, RFID tags, embedded antennas, antenna feeds, and location markers.

Overall, the splice tape 140 contributes to the efficiency of applying distribution cabling tape and the distribution cable to the road surface. The exemplary splice tape 140 provides the ability to splice a new roll of distribution cabling tape onto a depleted roll of distribution cabling tape in the field. The construction of the splice tape 140 provides ease of use and therefore a rapid splice timeframe. Minimal separation of the splice is observed after lamination to the road surface. The adhesion of the splice region to the road surface is also significantly improved due to the use of an adhesive designed for road surfaces.

The outdoor fiber pathway system thus allows a service provider the opportunity to quickly connect a sufficient number of customers in a neighborhood or building before making a large infrastructure investment. In this manner, each of the houses in this area of the neighborhood can be rapidly accessed without having to utilize directional drilling or other massive road destruction and repair procedures.

While a preferred application of the outdoor fiber pathway system is for telecommunication applications, as mentioned previously, other applications can include pathways for power, sensors or sensing or electronics for smart road applications.

Various modifications, equivalent processes, as well as numerous structures to which the present invention may be applicable will be readily apparent to those of skill in the art to which the present invention is directed upon review of the present specification.

We claim:

1. A pathway system for a telecommunications network, the pathway system comprising:
   first and second cabling tapes, each cabling tape have a butted end and an adhesive layer capable of adhering to a concrete or asphalt surface; and
   a splice tape having a first adhesive layer and a second adhesive layer, wherein the splice tape joins the first cabling tape to the second cabling tape by laminating the butted ends of the first and second cabling tapes via the second adhesive layer such that a portion of the splice tape overlaps each butted end of the first and second cabling tapes.

2. The pathway system of claim 1, further comprising:
   a channel for receiving a distribution cable, wherein the first and second cabling tapes are adhered to the concrete or asphalt surface by the adhesive layer of the first and second cable tapes and the first adhesive layer of the splice tape, and wherein the first and second cabling tapes cover the channel when adhered to the concrete or asphalt surface.

3. The pathway system of claim 2, further comprising the distribution cable disposed in the channel.

4. The pathway system of claim 3, wherein the channel is incorporated into the first and second cabling tapes.

5. The pathway system of claim 3, wherein the channel is incorporated into the concrete or asphalt surface.

6. The pathway system of claim 2, wherein the splice tape further comprises a first removable liner disposed on the first adhesive layer, the first removable liner being removable prior to deployment of the first adhesive layer onto the concrete or asphalt surface.

7. The pathway system of claim 3, wherein the distribution cable comprises an optical fiber.

* * * * *